United States Patent

[11] 3,542,050

[72] Inventor Edwin U. Sowers, III
   Silver Spring, Maryland
[21] Appl. No. 782,326
[22] Filed Dec. 9, 1968
[45] Patented Nov. 24, 1970
[73] Assignee Bowles Engineering Corporation
   Silver Spring, Maryland
   a corporation of Maryland

[54] FLUIDIC LIQUID LEVEL DETECTOR
   10 Claims, 3 Drawing Figs.
[52] U.S. Cl. .................................................. 137/81.5
[51] Int. Cl. ...................................................... F15c 1/10
[50] Field of Search .......................................... 137/81.5; -
   235/201p.f., sens., gen., m.e., 200 anal., p.f., gen.

[56] References Cited
   UNITED STATES PATENTS
| | | | |
|---|---|---|---|
| 3,204,652 | 9/1965 | Bauer | 137/81.5 |
| 3,340,885 | 9/1967 | Bauer | 137/81.5 |
| 3,379,204 | 4/1968 | Kelley et al. | 137/81.5 |
| 3,398,758 | 8/1968 | Unfried | 137/81.5 |
| 3,448,752 | 6/1969 | O'Neill | 137/81.5 |
| 3,456,668 | 7/1969 | Wheeler | 137/81.5 |
| 3,458,129 | 7/1969 | Woodson | 137/81.5X |
| 3,467,122 | 9/1969 | Jones | 137/81.5 |
| 3,468,325 | 9/1969 | Bowles | 137/81.5 |

Primary Examiner—Samuel Scott
Attorney—Hurvitz, Rose & Greene

ABSTRACT: A liquid level detector in a preferred embodiment, comprises a fluidic oscillator having a single feedback line which when blocked by liquid induces oscillations in the oscillator and when open to air inhibits oscillations. The oscillator output signal is divided, one path feeding a rectifier and filter and a second path feeding a resonant circuit and a rectifier and filter. The resonant circuit is tuned to the nominal operating frequency of the oscillator so that when the oscillator is oscillating the two output paths provide signals at different pressure levels and when the oscillator is inhibited the two output paths provide substantially equal pressure levels. The oscillator frequency is variable with the height of liquid in the feedback line so that the pressure differential provided between the two output paths varies with the level of the liquid.

Patented Nov. 24, 1970
3,542,050
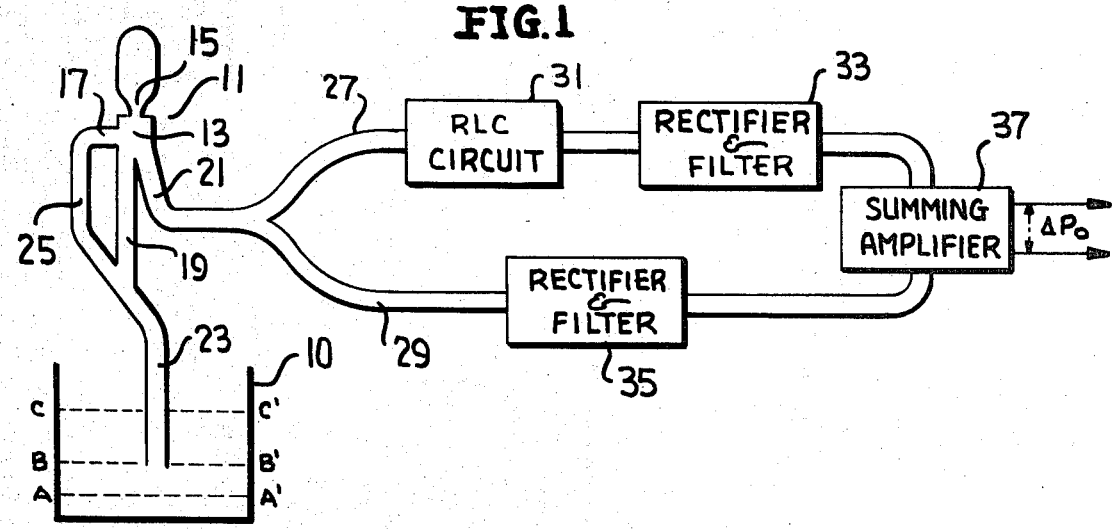
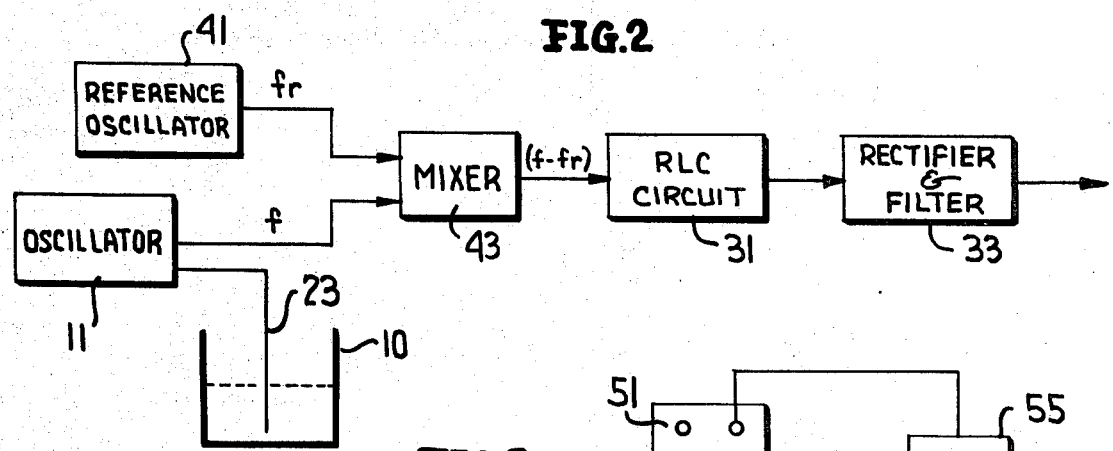
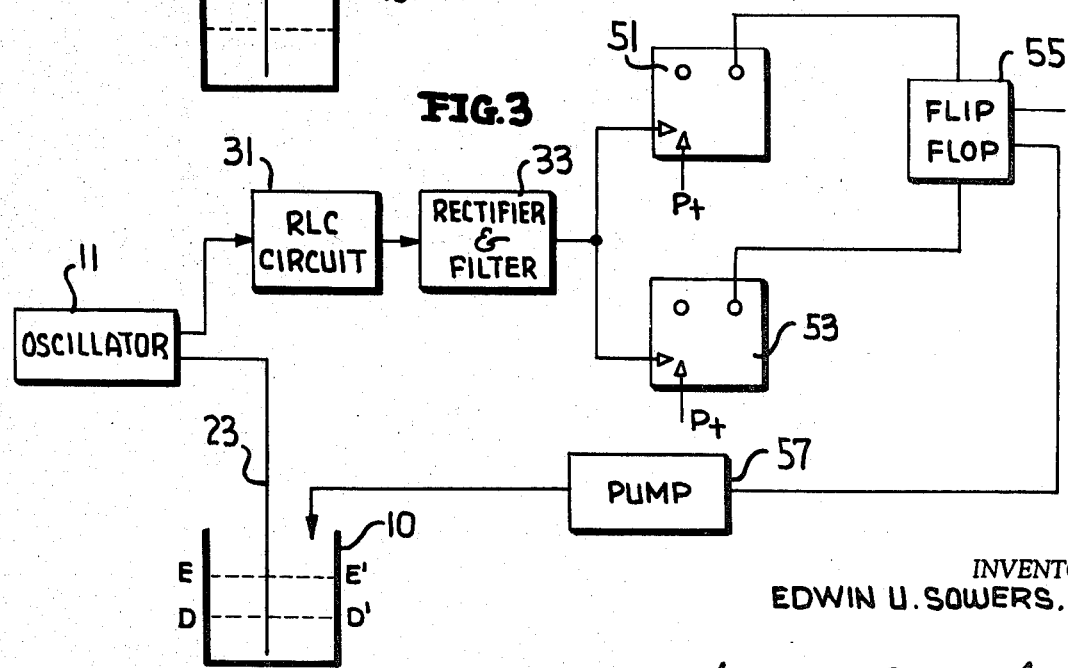
INVENTOR
EDWIN U. SOWERS, III
BY Hurvitz, Rose & Greene
ATTORNEYS

FLUIDIC LIQUID LEVEL DETECTOR

BACKGROUND OF THE INVENTION

The present invention relates to fluidic liquid level detection, and more particularly to a fluidic circuit in which oscillatory fluid signals are provided and sensed as a function of a liquid level.

Prior art fluidic liquid level detectors are of the "go-no go" type, providing a first fluid pressure when the sensed liquid level blocks the mouth of a sensor tube and a second fluid pressure when the mouth of the sensor tube is terminated in air. Examples of such devices may be found in U.S. Pat. No. 3,267,949 to Adams, U.S. Pat. No. 3,277,194 to Manion, U.S. Pat. application Ser. No. 490,246, filed Sept. 27, 1965, and U.S. Pat. application Ser. No. 713,480, filed Mar. 15, 1968. applications No.

None of the above-described prior art devices are capable of providing a signal pressure which varies in proportion to the level of the liquid being detected. It is evident a signal which so varies would be useful, both for measuring the level of the liquid and for initiating control functions as required upon the liquid achieving predetermined levels. For example, in the above-referenced U.S. Pat. applications No. 490,246 and No. 713,480 systems are disclosed which function to maintain the level of a liquid between two predetermined levels, attainment of said levels being sensed by two respective fluidic sensors of the "go-no go" type. A substantial reduction in cost and space would be achieved by a single liquid level detector which provides a signal pressure which varies in proportion to the level of the liquid and therefore could trigger appropriate control operations as the liquid attains the predetermined levels.

It is therefore an object of the present invention to provide a fluidic liquid level detector having an output signal which varies as a known function of the level of the liquid being detected.

It is a further object of the present invention to provide a fluidic liquid level detector having two alternative operational modes: one mode in which the detector output signal is a known function of the detected liquid level and a second mode in which the detector merely provides an indication as to whether or not the liquid is at or above a specified level.

SUMMARY OF THE INVENTION

In accordance with the principles of the present invention, liquid level detection is accomplished by monitoring oscillations in a fluidic oscillator. The oscillator itself may take many configurations, but, most importantly, is nonoscillatory when the liquid is below a predetermined level and oscillatory when the liquid is above the predetermined level. The oscillator provides an output signal which divides between two signal paths. One path comprises a resonant circuit in series with a rectifier and smoothing filter. The second path simply comprises a rectifier and smoothing filter. When the oscillator is nonoscillatory, a steady fluid signal is applied to each path, the steady signal being substantially unaffected by the resonant circuit and equally affected by the two rectifier-filter combinations to provide substantially zero pressure differential across the output ports of the two paths. When the oscillator is oscillatory, the resonant circuit amplifies (or attenuates if desired) the oscillatory signal, thereby providing a significant pressure differential across the output ports of the two paths.

If the oscillator is of the type in which the level of the liquid in the sensor tube determines the operating frequency of the oscillator, the variable-frequency signal experiences variable amplification (or attenuation) in the resonant circuit to produce a variable pressure differential across the two signal paths. If the frequency variation of the oscillator in response to liquid level changes is too small to be detected by the resonant circuit, the oscillatory signal may be heterodyned against a reference oscillator signal and the difference frequency variation may so be detected by a resonant circuit.

BRIEF DESCRIPTION OF THE DRAWINGS

The above and still further objects, features and advantages of the present invention will become apparent upon consideration of the following detailed description of the specific embodiments thereof, especially when taken in conjunction with the accompanying drawings, wherein:

FIG. 1 is a schematic drawing of a liquid level detector circuit constructed in accordance with the principles of the present invention;

FIG. 2 is a schematic drawing of a modified version of the liquid level detector of FIG. 1; and FIG. 3 is a schematic drawing of a system employing the liquid level detector of the present invention to maintain the liquid in a tank between two predetermined levels.

DETAILED DESCRIPTION OF THE PREFERRED EMBODIMENTS

Referring now specifically to FIG. 1 of the accompanying drawings, there is illustrated a tank 10 containing a liquid, the level of which is to be monitored. A fluidic oscillator element 11 comprises an interaction region 13, a power nozzle 15, a control nozzle 17 and a pair of output passages 19, 21. The power nozzle 15 is responsive to application of pressurized fluid thereto to issue a power stream into interaction region 13 generally toward output passages 19, 21. Control nozzle 17 is responsive to application of pressurized fluid thereto to issue a control stream in interacting relation with the power stream to deflect the latter toward output passage 21. The sidewalls of interaction region 13 are disposed to produce boundary layer effects on the power stream whereby the power stream may lock onto either sidewall.

A sensor tube 23, comprising an extension of output passage 19, extends to a predetermined level B-B' in tank 10, and a feedback passage 25 communicates between sensor tube 23 and control nozzle 17.

If there is no liquid in tank 10, or if the liquid level therein is below level B-B' (for example at level A-A'), the end of sensor tube 23 is terminated by the relatively low impedance air in tank 10. The power stream, in such a case, aspirates air from tank 10 via sensor tube 23, feedback passage 25 and control nozzle 17. No such aspiration path is provided on the side of the power stream opposite control nozzle 17 so that a pressure differential is developed across the power stream, deflecting the latter toward output passage 21. Because of the boundary layer phenomenon, the power stream locks onto the sidewall of chamber 13 which in part defines passage 21, and the power stream remains stably directed toward said passage as long as passage 19 remains terminated by air.

If the level of the liquid in tank 10 is raised to level B-B' so that sensor tube 23 is terminated by the relatively high impedance liquid, aspiration of air from tank 10 into interaction chamber 13 ceases. Nevertheless, the power stream continues to entrain the air remaining in sensor tube 23, feedback passage 25 and output passage 19 until the pressure to the left of the power stream (as viewed in FIG. 1) becomes sufficiently low to cause the power stream to switch over to passage 19. Upon switching of the power stream, a sonic pressure pulse travels the combined lengths of passages 19 and 23 until it reaches the level B-B' of the liquid. The sonic pressure pulse is reflected by the liquid level back through sensor tube 23, into feedback passage 25 and through control nozzle 17 to redeflect the power stream back to output passage 21. Once again the power stream begins aspirating the fluid remaining in passages 19, 23 and 25 until the pressure at the ingress of passage 19 is sufficiently low to cause the power stream to once again switch to passage 19. It is evident that an oscillation mode is developed due to the closure of sensor tube 23 by the liquid at level B-B', and that when the liquid is below level B-B' a steady or d. c. signal is provided at output passage 21.

Output passage 21 divides into two separate flow paths, 27 and 29 such that substantially equal flow division of the fluid in passage 21 is achieved. Signals traversing path 27 are fed to a resonant circuit 31 and a rectifier-filter circuit 33, connected in series. Resonant circuit 31 comprises R, L, and C (resistance, inertance and capacitance respectively) components interconnected to provide an impedance characteristic which varies in a known manner with the frequency of signals passing through the circuit. Circuits of this type and techniques for selecting desired impedance versus frequency characteristics are disclosed in U.S. Pat. No. 3,292,648. For purposes of the present discussion, it is assumed that circuit 31 is resonant at the frequency at which oscillator 11 operates when the liquid in tank 10 is at level B-B'. It will be understood, of course, that this choice of impedance versus frequency characteristic is by no means limiting on the scope of the present invention. The Q factor of the resonant circuit is assumed to be such that a signal at the resonant frequency is amplified substantially by circuit 31 relative to a nonalternating or d. c. signal. In fact, d. c. signals are assumed to pass through resonant circuit 31 substantially unaffected.

Rectifier and filter circuit 33 may be of the type disclosed in U.S. Pat. No. 3,292,648 and function to convert oscillatory or a. c. signals to d. c. signals of corresponding amplitude. A similar rectifier and filter circuit 35 is provided in flow path 29, and the two flow paths terminate in respective opposing control ports of a summing amplifier 37. The latter, by way of example, may be an analog fluidic amplifier of the stream interaction type which provides a differential pressure output signal $\Delta P_o$ as a function of the differential pressure between respective output ports of rectifier and filter circuits 33 and 35.

In operation, the circuit of FIG. 1 provides a zero pressure differential across the output ports of amplifier 37 when the liquid in tank 10 is below level B-B'. This is because oscillator 11 is nonoscillatory and provides a d. c. signal at passage 21 which is equally divided between paths 27 and 29. Resonant circuit 31 has negligible effect on d. c. signals and any losses introduced by rectifier-filter circuits 33 and 35 affect the divided signals equally. Consequently, equal signals appear at the control ports of amplifier 37 and $\Delta P_o$ is zero.

When the liquid in tank 10 is at level B-B', oscillator 11 assumes its oscillatory mode and an a. c. signal at the resonant frequency of circuit 31 is applied to both flow paths 27 and 29. The resonant circuit 31 amplifies the signal applied to path 27 but no such amplification is effected in path 29. Thus, the rectified and filtered d. c. signal provided by rectifier-filter circuit 33 is of significantly greater amplitude than the d. c. signal provided by rectifier filter circuit 35. The $\Delta P_o$ output signal from amplifier 37 thus assumes some appreciable level which can be employed for indication and/or control purposes.

As thus far described, the circuit of FIG. 1 is seen to perform a "go-no go" detection function, providing a monitorable signal, $\Delta P_o$, to indicate whether the liquid in tank 10 is at or below level B-B'. Upon examination of oscillator 11 however it is noted that the frequency of the oscillator signal is variable as a function of the liquid level in tank 10 whenever the liquid is at or above level B-B'. Specifically, the frequency of operation of oscillator 11 is determined by the time required for a pressure pulse to travel down through output passage 19 and sensor tube 23 and then be reflected back up through sensor tube 23 and feedback passage 25 to control nozzle 17. This time is varied as the level of the liquid in sensor tube 23 varies; this is because the pressure pulse reflects off the liquid surface and the point of reflection thus varies with the height of the liquid in tube 23. Thus, when the liquid in tank 10 is at level C-C', above level B-B', the transit time for the pressure pulse is substantially shorter than when the liquid is at level B-B'. Hence, the frequency of oscillator 11 is substantially higher when the liquid is at level C-C' than when it is at level B-B'. In fact, the frequency of oscillator 11 varies linearly with variations of the liquid level in sensor tube 23. If resonant circuit 31 is selected to provide a known impedance versus frequency characteristic over the operating frequency range of oscillator 11, the amplitude of the signal in flow path 27 will vary with frequency in accordance with that characteristic while the amplitude of the signal in path 29 remains unaffected by frequency variations. The output signal $\Delta P_o$ from amplifier 37 therefore provides a continuous measure of level of liquid in sensor tube 23.

It is to be noted that the specific configuration illustrated in FIG. 1 for oscillator 11 is by no means a limiting factor on the scope of the present invention. Any fluidic oscillator may be employed within the principles of the present invention so long as it provides a d. c. output signal when the liquid in tank 10 is below the open end of sensor tube 23 and provides an oscillatory output signal when the liquid in tank 10 blocks the end of sensor tube 23. Examples of such oscillators may be found in U.S. Pat. No. 3,204,652, and in copending U.S. Pat. application Ser. No. 705,345 by Peter Bauer, filed Feb. 14, 1968, entitled "Condition Responsive Pure Fluid Oscillator" and assigned to the same assignee as the present invention. Oscillators need not provide a variable frequency versus liquid level characteristic to be within the scope of the present invention, since for some applications a simple "go-no go" device may be sufficient.

It is also to be noted that circuit 31 need not be tuned to resonate at the frequency of oscillator 11 which corresponds to level B-B'. Any RLC circuit which provides a variable impedance versus frequency characteristic within the operating frequency range of oscillator 11 and which has negligible effect on d. c. signals may be employed.

It is to be further noted that path 29 may be eliminated if the system in which the present invention is employed requires an output signal on a single line rather than a differential pressure signal. This configuration is illustrated in FIG. 2 which additionally illustrates a further modification of the circuit of FIG. 1. More specifically, it is possible that for some applications of the level detector of the present invention, the variation in liquid level to be monitored is so small as to render the concomitant frequency variation too small to be readily detected by circuit 31. Under such circumstances, the output signal may be heterodyned or "beat" with a reference frequency signal to provide a difference frequency which varies with the frequency of oscillator 11 but over a proportionately greater range.

Referring specifically to FIG. 2, tank 10 is illustrated with sensor tube 23 extending thereinto from oscillator 11. Oscillator 11 functions as described above in reference to FIG. 1 to provide an a. c. signal having a frequency f which varies with the liquid level in tank 10. A reference oscillator 41 provides a fluid a. c. signal at a constant frequency $f_r$, and both signals (f and $f_r$) are applied to a frequency mixer 43. Mixer 43, by way of example, may be of the type disclosed in U.S. Pat. No. 3,292,648, and functions to provide an a. c. signal at a frequency $(f - f_r)$ equal to the difference between the two input frequencies. The mixer output signal is then applied to a single flow path comprising RLC circuit 31 and rectifier filter circuit 33, corresponding to flow path 27 in FIG. 1. If a differential pressure output signal is desired, the output signal from mixer 43 can be divided between two paths as is the output signal from oscillator 11 in FIG. 1.

To illustrate the advantage accruing by virtue of the heterodyning feature employed in the circuit of FIG. 2, assume that f is variable over the range from 105 to 110 Hz. The maximum variation is somewhat less than 5 percent and very well may not be great enough to provide a substantial output variation from circuit 31 in FIG. 1. If the reference frequency $f_r$ is chosen as 100 Hz, the output frequency $f - f_r$ from mixer 43 varies over the 5 to 10 Hz range, a variation of 100 percent which should be readily detectable.

Another point to note concerning the operation of the embodiment illustrated in FIG. 2 is that when the liquid in tank 10 is below the level of sensor tube 23, the mixer output signal is not a d. c. signal but rather an a. c. signal at frequency $f_r$. However, $f_r$ is sufficiently removed from the operating range of $f - f_r$ to produce a substantially different output signal amplitude from circuit 31 than is the case when the liquid in tank 10 is at or above the level of the open end of sensor tube 23.

Referring now specifically to FIG. 3, there is schematically illustrated a system for maintaining the level of liquid in a tank 10 between two predetermined levels D-D' and E-E'. Oscillator 11, sensor tube 23 and a single flow path comprising RLC circuit 31 and rectifier-filter circuit 33 are provided and function to provide a d. c. output signal from rectifier-filter circuit 33 having an amplitude which varies with the level of liquid in tank 10. This d. c. output signal is applied to a pair of threshold gates 51 and 53, for example of the fluidic OR/NOR type disclosed in U.S. Pat. No. 3,340,885. Gates 51 and 53 each assume one binary state when their input signal amplitude is below a predetermined threshold and a second binary state when the input signal amplitude is above that threshold. The threshold level is adjustable and it is assumed that the threshold for gate 51 corresponds to the signal level at the output port of rectifier-filter circuit 33 when the liquid in tank 10 is at level D-D'; it is further assumed that the threshold for gate 53 corresponds to the signal level at the output port of circuit 33 when the liquid in tank 10 is at level E-E'.

When gate 51 is in its NOR mode (that is, when the signal applied to gate 51 is below the threshold of gate 51) a signal is applied to one side of a fluidic bistable element or flip-flop 55 to place the latter in one of its two stable states. When gate 53 is in its OR mode (that is, when the input signal to gate 53 is equal to or greater than the threshold of gate 53) a signal is applied to flip-flop 55 to place the latter in the second of its two stable states. During the first mentioned stable state of flip-flop 55 an actuating signal is applied to a pump 57 which responds by pumping liquid into tank 10. When flip-flop 55 is in the second of its two stable states, no actuating signal is applied to pump 57 and liquid filling of tank 10 ceases.

Assume that the frequency characteristic of circuit 31 is such that a signal of increasing amplitude is provided thereby in response to increasing liquid level in tank 10. When the liquid is below level D-D', the signal applied to gates 51 and 53 is below the threshold of both gates, and gate 51 applies a signal to flip-flop 55 to place the latter in its pump-actuating state. Consequently, liquid is added to tank 10. When the liquid reaches level D-D', gate 51 switches to its OR mode, removing the input signal to flip-flop 55. The latter being bistable, however, remains in its pump-actuating state and the addition of liquid to tank 10 continues.

When the liquid attains level E-E' gate 53 switches to its OR mode and actuates flip-flop 55 to deactuate the pump and terminate the filling of tank 10. The pump cannot now be reactuated until the liquid falls below level D-D' at which time gate 51 is switched to its NOR mode and in turn switches flip-flop 55 to its pump-actuating mode. It is apparent that the system of FIG. 3 acts to maintain the liquid in tank 10 between levels D-D' and E-E'.

As discussed above, the fluidic level detector of the present invention may operate in either a "go-no go" mode or in a mode in which the level of the liquid is continuously measured. As to the former mode, it should be noted that the detector may be employed for functions other than liquid level detecting. For example, oscillator 11 may be employed to detect closure of tube 23 by a finger, a bimetal strip for temperature sensing, a humidity sensor, the armature of a relay or solenoid, or a sensed object upon proximity detection.

While I have described and illustrated the specific embodiments of my invention, it will be clear that variations of the details of construction which are specifically illustrated and described may be resorted to without departing from the true spirit and scope of the invention as defined in the appended claims.

I claim:

1. A fluidic sensor comprising:
    a tube having a sensing end;
    fluidic oscillator means for providing a fluid output signal at a substantially constant amplitude in response to the sensing end of said tube being open to a gaseous environment and responsive to closure of said sensing end of said tube for providing said fluid output signal at an alternating amplitude; and
    a fluid circuit means responsive to said output signal of said fluidic oscillator means for providing a fluid signal at a first nonalternating amplitude when said output signal is at a substantially constant amplitude and at a second nonalternating amplitude when said output signal is at an alternating amplitude.

2. The fluidic sensor according to claim 1 further comprising further fluid circuit means responsive to the fluid output signal from said fluidic oscillator means for providing a fluid signal at said first nonalternating amplitude when said output signal is at a substantially constant amplitude and at a third nonalternating amplitude when said output signal is at an alternating amplitude.

3. The fluidic sensor according to claim 2 utilized as a liquid level sensor wherein closure of said sensing end of said tube is effected by attainment of a predetermined level by liquid in a tank, said fluidic sensor being further characterized in that the frequency of oscillation of said fluidic oscillator means varies with the level of liquid in said tube, in that the fluid signal provided by said fluid circuit means has a nonalternating amplitude which varies as a function of the frequency of the fluid output signal from said fluidic oscillator means, and in that the fluid signal provided by said further fluid circuit means has an amplitude which does not vary with the frequency of the output signal from said fluidic oscillator means.

4. The fluidic sensor according to claim 1 utilized as a liquid level sensor wherein closure of the sensing end of said tube is caused by the attainment of a predetermined level by liquid in a tank, said fluidic sensor being further characterized in that the frequency of oscillation of said fluidic oscillator means varies with the level of liquid in said tube, and in that the fluid signal provided by said fluid circuit means has a nonalternating amplitude which varies as a function of the frequency of the fluid output signal from said fluidic oscillator means.

5. The fluidic sensor according to claim 4 further comprising reference oscillator means for providing a fluid signal of alternating amplitude at a fixed frequency, frequency mixer means for providing a fluid signal of alternating amplitude at a frequency equal to the difference in frequency between the fluid signal provided by said reference oscillator means and the fluid output signal provided by said fluidic oscillator means, and means for applying the fluid signal provided by said mixer means to said fluid circuit means.

6. The fluidic sensor according to claim 4 employed in a system for maintaining the liquid in said tank between first and second predetermined levels, said system further comprising:
    first fluidic logic gate means responsive to the fluid signal provided by said fluid circuit means for providing a first fluid switching signal when the liquid level in said tank is below said first predetermined level;
    second fluidic logic gate means responsive to the fluid signal provided by said fluid circuit means for providing a second fluid switching signal when the liquid in said tank is below said second predetermined level;
    bistable fluidic means responsive to said first fluid switching signal for assuming a first stable state and responsive to said second fluid switching signal for assuming a second stable state; and
    means responsive to bistable fluidic means when in said first stable state to add liquid to said tank.

7. A fluidic sensor for monitoring the level of liquid in a liquid container, comprising: a fluidic element having a power nozzle responsive to application of fluid thereto for issuing a power stream of fluid, first and second output passages disposed for receiving said power stream, said first output passage comprising a sensor tube having its downstream end disposed in said container, first means for stably deflecting said power stream toward said second output passage when said downstream end of said sensor tube is not blocked by liquid in said tank, and second means responsive to blockage of said sensor tube by said liquid for oscillating said power stream between said first and second output passages.

8. The fluidic sensor according to claim 7 further comprising resonant fluid circuit means responsive to said power stream when stably deflected toward said second output passage for providing a fluid signal at a first amplitude and responsive to said power stream when oscillating to provide a fluid signal at a second amplitude.

9. The fluidic sensor according to claim 8 wherein said second means comprises means responsive to aspiration of fluid from said first output passage by said power stream when said power stream is directed toward said second output passage and when said sensor tube is blocked by liquid for deflecting said power stream to said first output passage, and means for directing pressure pulses received by said first output passage upon switching of said power stream thereto against the surface of liquid blocking said sensor tube and reflecting said pressure pulses back for deflecting said power stream to said second output passage.

10. The fluidic sensor according to claim 9 wherein the time required for said pressure pulses to deflect said power stream towards said second output passage after said power stream is switched to said first output passage is variable with the level of liquid in said sensor, whereby the frequency of oscillation of said power stream is variable with the level of liquid in said sensor tube, and wherein said fluid circuit means is responsive to said power stream when oscillating to provide a nonoscillatory fluid signal having an amplitude which varies with the frequency of oscillation of said power stream.